(12) United States Patent
Oh et al.

(10) Patent No.: US 10,308,096 B2
(45) Date of Patent: Jun. 4, 2019

(54) HVAC SYSTEM OF VEHICLE

(71) Applicants: Hyundai Motor Company, Seoul (KR); Kia Motors Corporation, Seoul (KR)

(72) Inventors: Man Ju Oh, Yongin-si (KR); Sang Shin Lee, Suwon-si (KR); Jae Woo Park, Ansan-si (KR); So Yoon Park, Suwon-si (KR); Jae Woong Kim, Hwaseong-si (KR); So La Chung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/809,408

(22) Filed: Nov. 10, 2017

(65) Prior Publication Data

US 2018/0345758 A1 Dec. 6, 2018

(30) Foreign Application Priority Data

May 30, 2017 (KR) .................. 10-2017-0066543

(51) Int. Cl.
*B60H 1/00* (2006.01)
*B60H 1/32* (2006.01)
*B60L 58/26* (2019.01)

(52) U.S. Cl.
CPC ..... *B60H 1/00885* (2013.01); *B60H 1/00278* (2013.01); *B60H 1/00385* (2013.01); *B60H 1/323* (2013.01); *B60L 58/26* (2019.02); *B60H 2001/00928* (2013.01)

(58) Field of Classification Search
CPC ............ B60H 1/00885; B60H 1/00385; B60H 1/323; B60H 1/00278; B60H 1/00928
See application file for complete search history.

(56) References Cited

U.S. PATENT DOCUMENTS

| 7,287,581 | B2 * | 10/2007 | Ziehr | ................. | B60H 1/00392 |
| | | | | | 165/202 |
| 2006/0060340 | A1 * | 3/2006 | Busse | ................ | B60H 1/00278 |
| | | | | | 165/202 |

(Continued)

FOREIGN PATENT DOCUMENTS

KR 10-1448656 B1 10/2014

*Primary Examiner* — Kun Kai Ma
(74) *Attorney, Agent, or Firm* — Morgan, Lewis & Bockius LLP

(57) ABSTRACT

A heating, ventilating, and air conditioning (HVAC) system of a vehicle may include a battery cooling line to circulate a first coolant through a first radiator, a high voltage battery core, and a first valve; an electronic component cooling line to circulate a second coolant through a second radiator, an electronic component core, and a second valve; a branch line having a first end portion branched from the first valve and a second end portion connected to an upstream point of the high voltage battery core; an auxiliary line having a first end portion branched from the second valve and a second end portion connected to an upstream point of the electronic component core; and a controller performing heat transfer in the main heat exchanger by controlling the first valve and the second valve when a temperature of the high voltage battery core is required to be increased.

14 Claims, 4 Drawing Sheets

(56) References Cited

U.S. PATENT DOCUMENTS

| | | | | |
|---|---|---|---|---|
| 2008/0251235 A1* | 10/2008 | Zhou | ................. | B60H 1/00278 |
| | | | | 165/41 |
| 2011/0174000 A1* | 7/2011 | Richter | ............. | B60H 1/00064 |
| | | | | 62/93 |
| 2011/0214838 A1* | 9/2011 | Akiyama | ........... | B60H 1/00278 |
| | | | | 165/41 |
| 2012/0225341 A1* | 9/2012 | Major | ................ | B60H 1/00278 |
| | | | | 429/120 |
| 2013/0213058 A1* | 8/2013 | Goenka | ............. | B60H 1/00478 |
| | | | | 62/3.3 |
| 2014/0014421 A1* | 1/2014 | Carpenter | ......... | H01M 10/5006 |
| | | | | 180/65.1 |
| 2014/0332179 A1* | 11/2014 | Vandike | ............. | B60H 1/00278 |
| | | | | 165/42 |
| 2014/0374060 A1* | 12/2014 | Labaste Mauhe | ........................... | |
| | | | | B60H 1/00278 |
| | | | | 165/62 |
| 2015/0034272 A1* | 2/2015 | Saab | ................. | B60H 1/00278 |
| | | | | 165/43 |
| 2016/0248129 A1* | 8/2016 | Dunham | ............. | H01M 10/625 |
| 2016/0344075 A1* | 11/2016 | Blatchley | .............. | H01M 10/66 |
| 2018/0222286 A1* | 8/2018 | Blatchley | ............ | H01M 10/625 |

* cited by examiner

HVAC SYSTEM OF VEHICLE

CROSS-REFERENCE(S) TO RELATED APPLICATIONS

The present application claims priority to Korean Patent Application No. 10-2017-0066543, filed on May 30, 2017, the entire contents of which is hereby incorporated for all purposes by this reference.

BACKGROUND OF THE INVENTION

Field of the Invention

The present invention relates to a heating, ventilating, and air conditioning (HVAC) system of a vehicle, and more particularly, to a heating, ventilating, and air conditioning (HVAC) system of a vehicle that may reduce energy consumption and extend a mileage of the vehicle by minimizing a movement of energy by increasing a temperature of a high voltage battery side using a coolant having an increased temperature obtained by cooling an electronic component side during a winter driving of the vehicle.

Description of Related Art

Electric vehicles are recently emerged as social issues to implement an eco-friendly technology and to solve problems including energy exhaustion, and the like. The electric vehicle is operated using a motor that receives electricity from a battery and outputs power. Therefore, since the electric vehicle has advantages in that it does not discharge carbon dioxide, generates very little noise, and has energy efficiency of the motor higher than that of an internal combustion engine, the electric vehicle is highlighted as the eco-friendly vehicle.

A core technology to implement such an electric vehicle is a technology related to a battery module, and research on weight lightening, miniaturization, and a short charging time, and the like of the battery are actively performed in the recent years. The battery module may maintain an optimal performance and a long service lifespan when it is used in an optimal temperature environment. However, it is difficult to use the battery in the optimal temperature environment due to heat generated during an operation of the battery and an external temperature change.

In addition, since the electric vehicle does not have a waste heat source generated during combustion in a separate engine including an internal combustion engine, the electric vehicle performs indoor heating of the vehicle in winter utilizing an electric heater, and since the electric vehicle requires a warm-up period to improve charging and discharging performance of the battery in cold weather, the electric vehicle each configures and uses a separate coolant heated electric heater. That is, the electric vehicle adopts a technology that operates a cooling and heating system for adjusting the temperature of the battery module to maintain the optimal temperature environment of the battery module separately from a cooling and heating system for an indoor HVAC system of the vehicle. In other words, the electric vehicle constructs two independent cooling and heating systems, such that one is used to perform the indoor cooling and heating of the vehicle and the other is used to adjust the temperature of the battery module.

However, in a case in which the electric vehicle is operated by the method as described above, since energy is not efficiently managed, a cruising distance is short, which disables a long distance operation, and the mileage is reduced by 30% at the time of cooling in summer and 40% or more at the time of heating in winter, which causes a heating problem in winter which was not a problem in the internal combustion engine.

In particular, in winter, since a heating amount required of the electronic component is greater than that of a high voltage battery element and the high voltage battery has a larger contact area with air, more cooling occurs than heating of the high voltage battery due to an external air temperature at the time of driving. As a result, an appropriate temperature at which the high voltage battery is operated is not satisfied, which results in a reduction of an output of the high voltage battery. Therefore, the temperature of the high voltage battery should be increased during the driving to efficiently manage the temperature of the high voltage battery in winter.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a heating, ventilating, and air conditioning (HVAC) system of a vehicle configured for extending a mileage and reducing the cost of production by efficiently managing energy required to heat an internal of the vehicle and to increase a temperature of a battery.

According to an exemplary embodiment of the present invention, there is provided a heating, ventilating, and air conditioning (HVAC) system of a vehicle including: a battery cooling line configured to circulate a first coolant through a first radiator, a high voltage battery core, and a first valve; an electronic component cooling line configured to circulate a second coolant through a second radiator, an electronic component core, and a second valve; a branch line configured to have one end portion branched from the first valve and the other end portion connected to an upstream point of the high voltage battery core, and passes through a main heat exchanger; an auxiliary line configured to have one end portion branched from the second valve and the other end portion connected to an upstream point of the electronic component core, and passes through the main heat exchanger to perform a heat transfer with the branch line; and a controller configured for circulating the first coolant and the second coolant in the branch line and the auxiliary line, respectively, and performing the heat transfer in the main heat exchanger by controlling the first valve and the second valve when a temperature of the high voltage battery core is required to be increased.

The branch line and the auxiliary line may configure the respectively independent flow passages, and the coolant of the branch line and the coolant of the auxiliary line may perform the heat transfer with each other in the main heat exchanger.

The first valve may be a three-way valve, and include a first port of the high voltage battery core side, a second port of one end side of the branch line, and a third port of the first radiator side, the controller may close the third port of the first valve when the temperature of the high voltage battery core is required to be increased, and the controller may close the second port of the first valve when a cooling of the high voltage battery core through heat radiation of the first radiator is required.

The second valve may be a three-way valve, and includes a first port of the electronic component core side, a second port of one end side of the auxiliary line, and a third port of the second radiator side, and the controller may open all of the ports of the second valve when the temperature of the high voltage battery core is required to be increased, and close the second port of the second valve when the temperature of the high voltage battery core is not required to be increased.

The battery cooling line may include a first pump, the electronic component cooling line may include a second pump, and the controller may perform a control to drive or stop the first pump or the second pump.

The first pump may be positioned between an upstream point of the first valve and the other end portion of the branch line on the battery cooling line.

The second pump may be positioned between an upstream point of the second valve and the other end portion of the auxiliary line on the electronic component cooling line.

The battery cooling line may include an auxiliary heat exchanger provided thereon, and the auxiliary heat exchanger may be disposed between a downstream point of the high voltage battery core and an upstream point of the first valve.

The battery cooling line may be configured to be able to perform the heat transfer with a refrigerant line for indoor HVAC through the auxiliary heat exchanger, and the first coolant performing the heat transfer with the refrigerant line at the time of cooling of the high voltage battery core may cool the high voltage battery core.

The refrigerant line may include a third valve that supplies or blocks the refrigerant wherein the heat transfer between the refrigerant of the refrigerant line and the first coolant of the battery cooling line is performed in the auxiliary heat exchanger.

In a case of a cooling mode, the controller may connect the battery cooling line and the branch line with each other by controlling the first valve, and perform a control wherein the first coolant cooled by performing the heat transfer with the refrigerant of the refrigerant line through the auxiliary heat exchanger cools the high voltage battery core.

In a case of a battery temperature increasing mode, the controller may perform a control wherein the second coolant cooling the electronic component cooling line and the first coolant perform the heat transfer in the main heat exchanger to increase the temperature and then increase the temperature of the high voltage battery core, by controlling the first valve to connect the battery cooling line and the branch line with each other and fully opening the second value to connect the electronic component cooling line and the auxiliary line with each other.

In a case of a natural cooling mode, the controller may perform a control to circulate the first coolant in the battery cooling line by controlling the first valve, and performs a control wherein the first coolant cooled through the first radiator cools the high voltage battery core.

The branch line may include an electric heater configured for increasing a temperature of the first coolant, and the electric heater may be disposed between one end portion of the branch line and the upstream point of the high voltage battery core.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
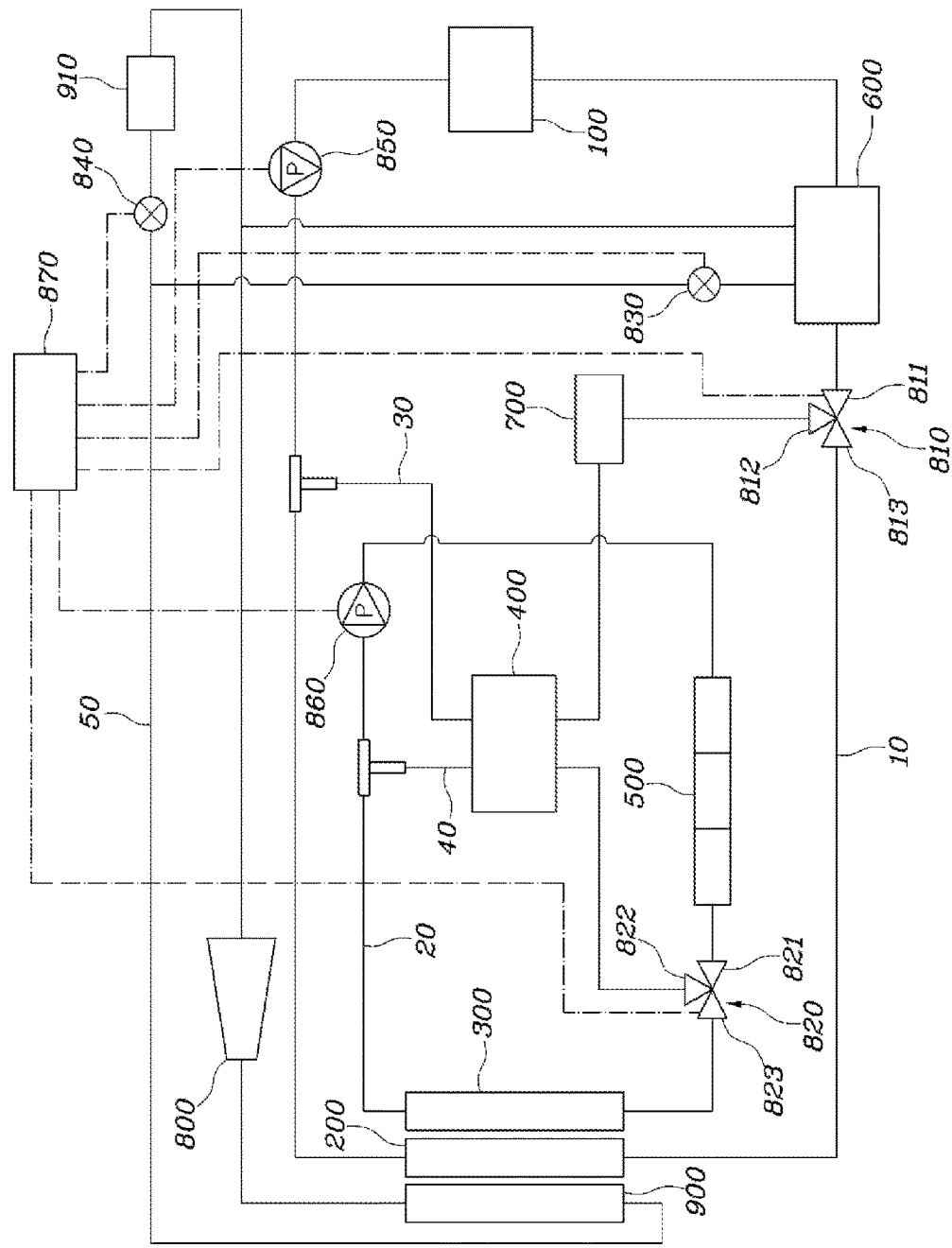
FIG. 1 is a view illustrating a heating, ventilating, and air conditioning (HVAC) system of a vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
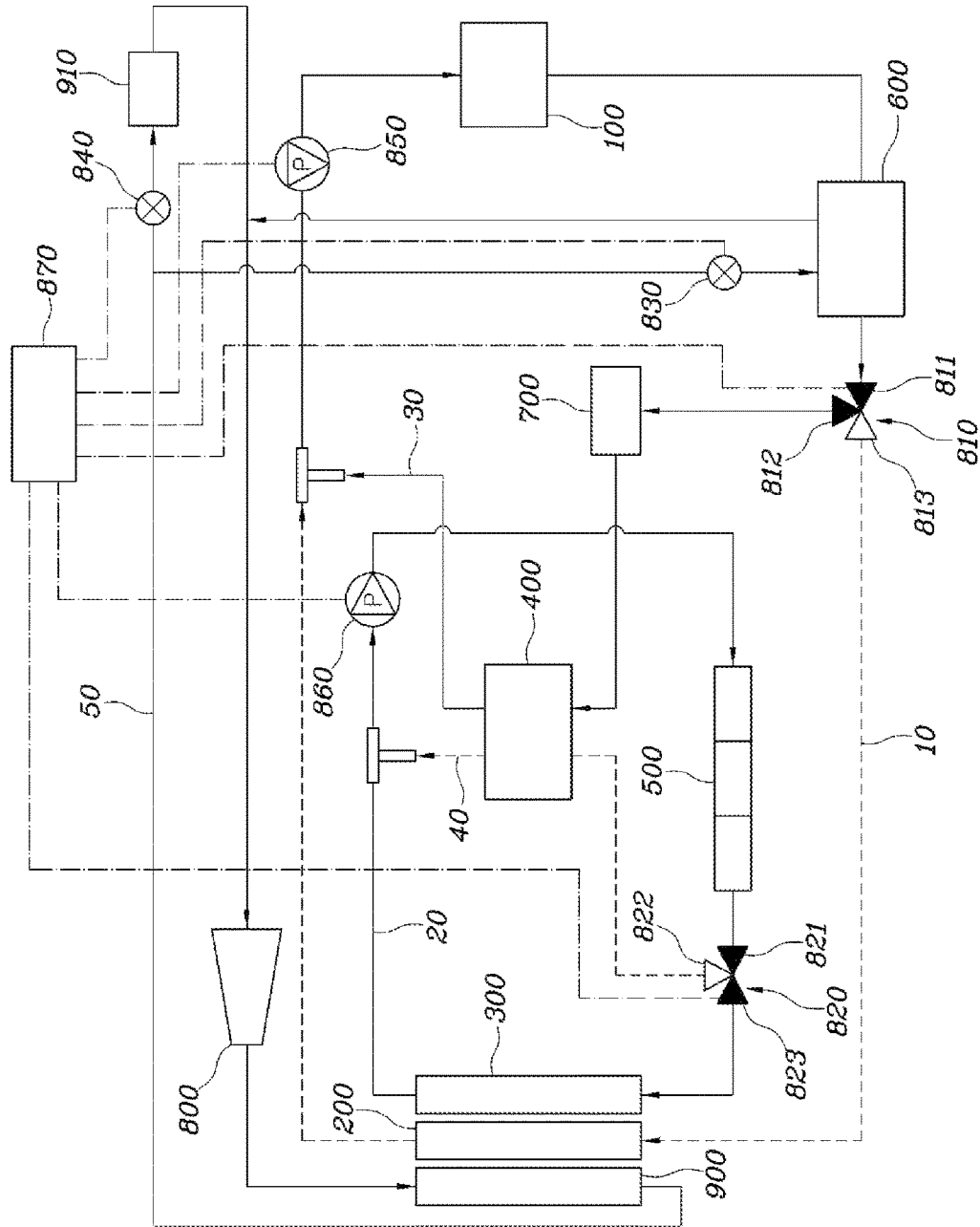
FIG. 2 is a view illustrating a cooling mode of FIG. 1.
Figure 3:
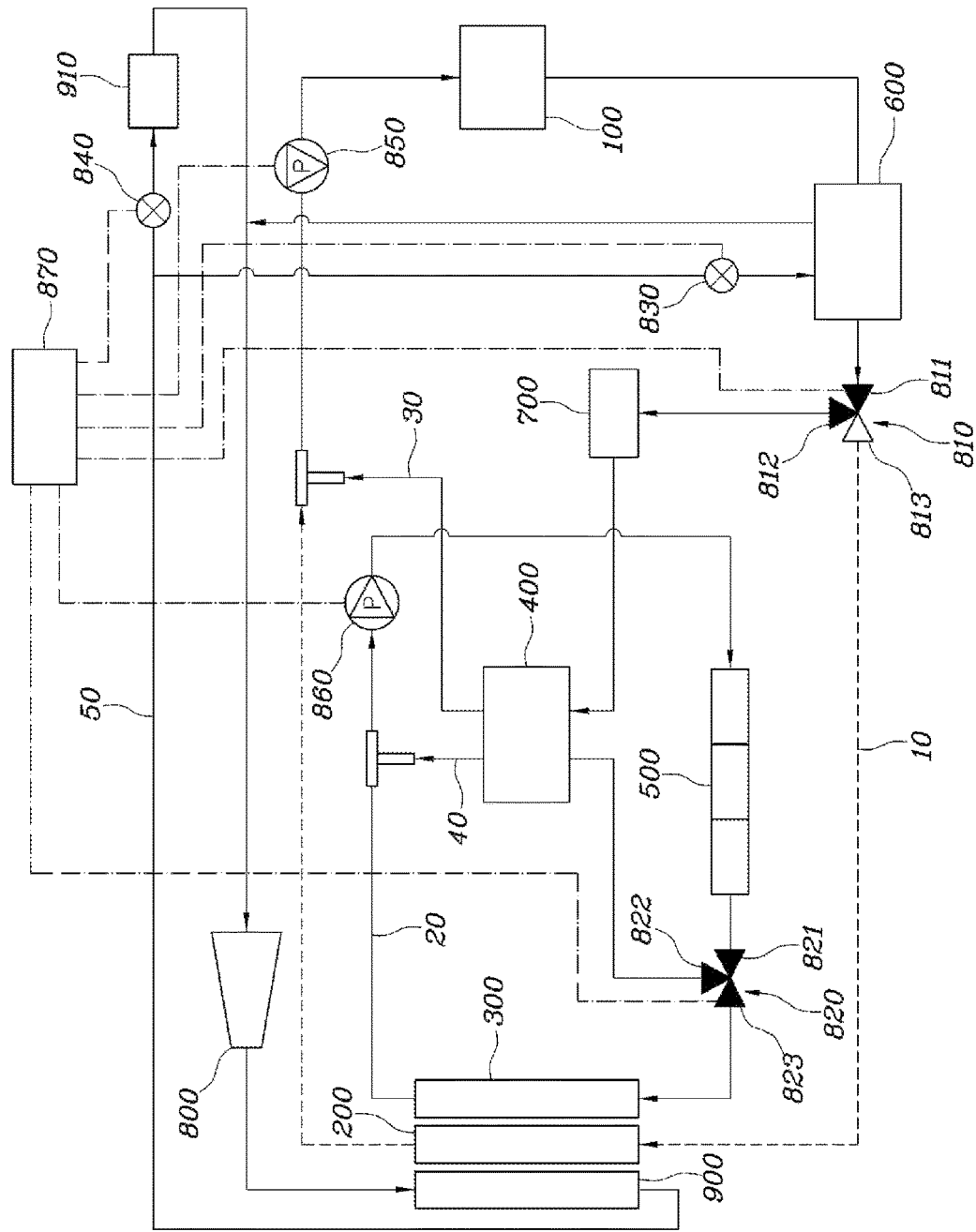
FIG. 3 is a view illustrating a mode of recovering a waste heat of FIG. 1 and increasing a temperature of a battery.
Figure 4:
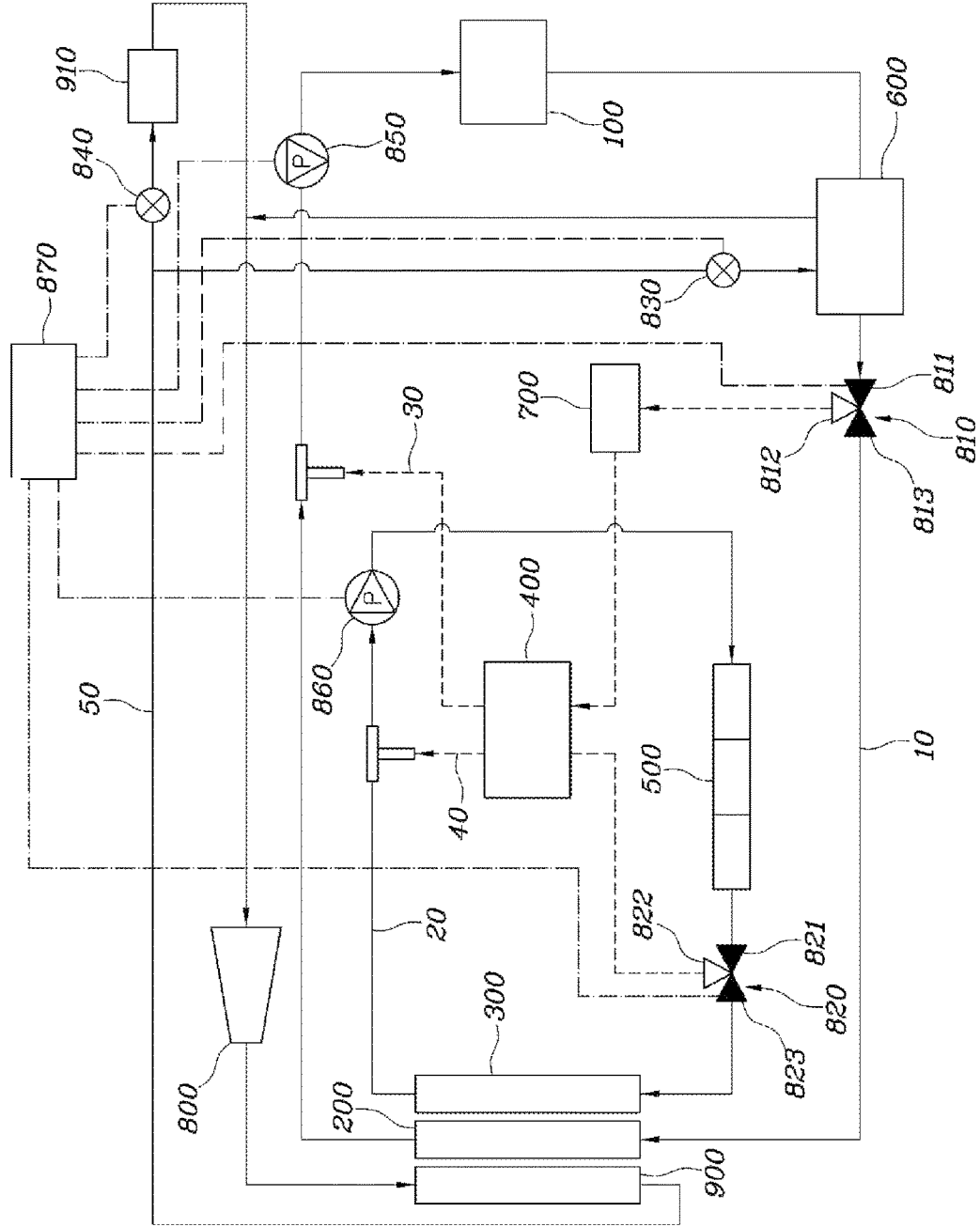
FIG. 4 is a view illustrating a natural cooling mode of FIG. 1.

FIG. 1 is a view illustrating a heating, ventilating, and air conditioning (HVAC) system of a vehicle according to an exemplary embodiment of the present invention, FIG. 2 is a view illustrating a cooling mode of FIG. 1, FIG. 3 is a view illustrating a mode of recovering a waste heat of FIG. 1 and increasing a temperature of a battery, and FIG. 4 is a view illustrating a natural cooling mode of FIG. 1.

As illustrated in FIG. 1, a heating, ventilating, and air conditioning (HVAC) system of a vehicle according to an exemplary embodiment of the present invention includes a battery cooling line 10 configured to circulate a first coolant through a first radiator 200, a high voltage battery core 100, and a first valve 810; an electronic component cooling line 20 configured to circulate a second coolant through a second radiator 300, an electronic component core 500, and a second valve 820; a branch line 30 configured to have one end portion branched from the first valve 810 and the other end portion connected to an upstream point of the high voltage battery core 100, and passes through a main heat exchanger 400; an auxiliary line 40 configured to have one end portion branched from the second valve 820 and the other end portion connected to an upstream point of the electronic component core 500, and passes through the main heat exchanger 400 to perform a heat transfer with the branch line 30; and a controller 870 configured for circulating the first coolant and the second coolant in the branch line 30 and the auxiliary line 40, respectively, and performing the heat transfer in the main heat exchanger 400 by controlling the first valve 810 and the second valve 820 when a temperature of the high voltage battery core 100 is required to be increased.

The battery cooling line 10 is configured to circulate the coolant through the first radiator 200, the high voltage battery core 100, and the first valve 810, and further includes a first pump 850 configured to be driven or stopped by the controller 870. Here, the first pump 850 is disposed between the upstream point of the first valve 810 and the second end portion of the branch line 30 on the battery cooling line 10, and is formed to affect a line: whether the line in which the first coolant is circulated via the first radiator 200 is formed or the line in which the first coolant passes through the branch line 30 without passing through the first radiator 200 is formed.

The first valve 810 is a three-way valve, and includes a first port 811 of the high voltage battery core 100 side, a second port 812 of the first end side of the branch line 30, and a third port 813 of the first radiator 200 side. The controller 870 performs a function wherein the battery cooling line 10 is connected to the branch line 30 and the first coolant cools the high voltage battery core 100 without passing through the first radiator 200, by closing the third port 813 of the first valve 810 and connecting the first port 811 and the second port 812 to each other, when the temperature of the high voltage battery core 100 is required to be increased. In addition, the controller 870 performs a control so that the battery cooling line 10 is disconnected from the branch line 30 and the first coolant cools the high voltage battery core 100 after being cooled through the first radiator 200, by closing the second port 812 of the first valve 810 and connecting the first port 811 and the third port 813 to each other, when the cooling of the high voltage battery core 100 through heat radiation of the first radiator 200 is required.

In addition, an auxiliary heat exchanger 600 is provided on the battery cooling line 10, and the auxiliary heat exchanger 600 is disposed between a downstream point of the high voltage battery core 100 and the upstream point of the first valve 810. The battery cooling line 10 is configured to be able to perform the heat transfer with a refrigerant line 50 for indoor HVAC through the auxiliary heat exchanger 600. The refrigerant line 50 for indoor HVAC may include an air-cooled condenser 900, an evaporator 910, a compressor 800, a third valve 830, a fourth valve 840, and an expansion value. Therefore, at the time of cooling of the high voltage battery core 100, after the coolant of the refrigerant line 50 cooled through the expansion valve of the refrigerant line 50 for indoor HVAC and the first coolant perform the heat transfer in the auxiliary heat exchanger 600, the high voltage battery core 100 is cooled. The refrigerant line 50 includes the third value 830 that supplies or blocks the refrigerant wherein the refrigerant of the refrigerant line 50 are able to perform the heat transfer with the first coolant of the battery cooling line 10 in the auxiliary heat exchanger 600, and a front end portion of the evaporator 910 for indoor HVAC includes the fourth value 840. The third valve 830 or the fourth valve 840 are operated to be open or closed by the controller 870, making it possible to perform the heat transfer between the refrigerant of the refrigerant line 50 and the first coolant of the battery cooling line 10.

The branch line 30 has one end portion branched from the first valve 810 and the other end portion connected to the upstream point of the high voltage battery core 100, and passes through the main heat exchanger 400. The branch line 300 includes an electric heater 700 configured for increasing the temperature of the first coolant, and the electric heater 700 may be disposed between the one end portion of the branch line 30 and the upstream point of the high voltage battery core 100. Therefore, the first coolant that increases the temperature of the high voltage battery core 100 at the time of increasing the temperature of the high voltage battery core 100 may be heated by the electric heater 700 and then perform the heat transfer through the main heat exchanger 400, or contrarily, may perform the heat transfer through the main heat exchanger 400 and then increase the temperature thereof by the electric heater 700. In addition, in a case in which a temperature adjustment function of the electric heater fails, the controller 870 may perform a safety function of adjusting the temperature by controlling the first valve 810 to adjust a flow rate.

The electronic component cooling line 20 is configured to circulate the second coolant through the second radiator 300, the electronic component core 500, and the second valve 820, and further includes a second pump 860 configured to be driven or stopped by the controller 870. Here, the second pump 860 is disposed between the upstream point of the second valve 820 and the other end portion of the auxiliary line 40 on the electronic component cooling line 20, and is formed at affect a line whether the line in which the second coolant is circulated via the second radiator 300 is formed, or the line in which the second coolant is circulated via the second radiator 300 together with the auxiliary line 40 is formed.

The second valve 820 is a three-way valve, and includes a first port 821 of the electronic component core 500 side, a second port 822 of one end side of the auxiliary line 40, and a third port 813 of the second radiator 300 side. The controller 870 is configured wherein the second coolant is circulated through both of the electronic component cooling line 20 and the auxiliary line 40 by opening all ports 821, 822, and 823 of the second valve 820 when the temperature of the high voltage battery core 100 is required to be increased. In addition, in a case in which the temperature of the high voltage battery core 100 is not required to be increased, the controller 870 performs a control to cool the electronic component core 500 by closing the second port 822 of the second valve 820 and circulating the second coolant in the electronic component cooling line 20.

In addition, the auxiliary line 40 has one end portion branched from the second valve 820 and the other end portion connected to the upstream point of the electronic component core 500 and passes through the main heat exchanger 400, performing the heat transfer with the branch line 30. The branch line 30 and the auxiliary line 40 configure the respectively independent flow passages, and are configured herein the coolant of the branch line 30 and the coolant of the auxiliary line 40 perform the heat transfer with each other in the main heat exchanger 400.

A flow of the coolant in the respective modes will be described with reference to the accompanying drawings.

FIG. 2 is a view illustrating a cooling mode, and in the case of the cooling mode, the controller 870 performs a control to connect the first port 811 and the second port 812 of the first valve 810 with each other and to close the third port 813, connecting the battery cooling line 10 and the branch line 30 with each other. In the present case, the first coolant is not circulated toward the first radiator 200 side. Since the present case is a situation in which the vehicle also requires cooling, the controller 870 controls the third valve 830 and the fourth valve 840, wherein the battery cooling line 10 is connected to the branch line 30 and the refrigerant line 50 for indoor HVAC. Therefore, the first coolant cooled by performing the heat transfer with the refrigerant of the refrigerant line 50 through the auxiliary heat exchanger 600 is injected to the high voltage battery core 100 via the first pump 850 along the branch line 30, cooling the high voltage battery core 100.

In the present case, the controller 870 performs a control to connect the first port 812 and the second port 822 of the second valve 820 with each other and to close the third port 823, and as a result, in the electronic component cooling line 20, the second coolant is cooled by the second radiator 300 and is then provided to the electronic component core 500 through the second pump 860, cooling the electronic component core 500. In the present case, the electric heater 700 is not operated, and the heat transfer is not performed in the main heat exchanger 400.

FIG. 3 is a view illustrating a mode of recovering waste heat and increasing the temperature of the high voltage battery, and the present mode is referred to as a battery temperature increasing mode. In the case of the battery temperature increasing mode, the controller 870 performs a control to connect the first port 811 and the second port 812 of the first valve 810 with each other and to close the third port 813, connecting the battery cooling line 10 and the branch line 30 with each other. In the present case, the first coolant is not circulated toward the first radiator 200 side. Since the present case is a situation in which the internal of the vehicle also requires the heating, the controller 870 controls the third valve 830 and the fourth valve 840, wherein the battery cooling line 10 is connected to the branch line 30 and the refrigerant line 50 for indoor HVAC. Therefore, the first coolant having the increased temperature obtained by performing the heat transfer with the refrigerant of the refrigerant line 50 through the auxiliary heat exchanger 600 increases the temperature thereof through the electric heater 700 and the main heat exchanger 400 of the branch line 30 or the main heat exchanger 400 and the electric heater 700 of the branch line 30, and is then injected to the high voltage battery core 100 through the first pump 850, increasing the temperature of the high voltage battery core 100.

The reasons that the present situation is possible are that the controller 870 performs a control to open both of the first port 821, the second port 822, and the third port 823 of the second valve 820, and as a result, in the electronic component cooling line 20, the second coolant is cooled by the second radiator 300 and is then provided to the electronic component core 500 through the second pump 860, cooling the electronic component core 500. In the present case, the second coolant having the increased temperature performs the heat transfer with the first coolant in the main heat exchanger 400 along the auxiliary line 40, and is additionally cooled. Therefore, the temperature of the high voltage battery core 100 is increased using the waste heat of the second coolant obtained by cooling the electronic component core 500, making it possible to efficiently maintain energy, to extend a mileage of the vehicle, and to reduce the cost of production.

Finally, FIG. 4 is a view illustrating a natural cooling mode, and in the case of the natural cooling mode, the controller 870 performs a control to connect the first port 811 and the third port 813 of the first valve 810 with each other and to close the second port 812, disconnecting the battery cooling line 10 and the branch line 30 from each other. In the present case, the heat transfer with the refrigerant of the refrigerant line 50 for indoor HVAC through the auxiliary heat exchanger 600 is not performed. Therefore, the first coolant is configured to be circulated in the battery cooling line 10 wherein the first coolant is cooled through the first radiator 200, cools the high voltage battery core 100, and is then again supplied to the first radiator 200.

In the present case, the controller 870 performs a control to connect the first port 821 and the third port 823 of the second valve 820 with each other and to close the second port 822, disconnecting the electronic component cooling line 20 and the auxiliary line 40 from each other. In the electronic component cooling line 20, the second coolant is cooled by the second radiator 300 and is then provided to the electronic component core 500 through the second pump 860, cooling the electronic component core 500.

Therefore, according to the HVAC system of the vehicle as described above, the temperature of the high voltage battery is increased using the waste heat of the coolant having the increased temperature obtained by cooling the electronic component side, making it possible to efficiently manage the energy, to extend the mileage of the vehicle, and to reduce the cost of production even by a compact configuration. Further, in a case in which the temperature adjustment function of the electric heater fails, the flow rate is controlled through the first valve, making it possible to perform the safety function.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heating, ventilating, and air conditioning (HVAC) system of a vehicle, the HVAC system comprising:
    a battery cooling line provided to circulate a first coolant through a first radiator, a battery core, and a first valve;
    an electronic component cooling line provided to circulate a second coolant through a second radiator, an electronic component core, and a second valve;
    a branch line provided to have a first end portion branched from the first valve and a second end portion connected to an upstream point of the battery core, wherein a main heat exchanger is disposed between the first end portion and the second end portion of the branch line;
    an auxiliary line provided to have a first end portion branched from the second valve and a second end portion connected to an upstream point of the electronic component core, and to pass through the main heat exchanger to perform a heat transfer with the branch line; and
    a controller configured for circulating the first coolant and the second coolant in the branch line and the auxiliary line, respectively, and performing the heat transfer in the main heat exchanger by controlling the first valve and the second valve when a temperature of the battery core is required to be increased.

2. The HVAC system of claim 1, wherein the branch line and the auxiliary line configure respectively independent flow passages, and a coolant of the branch line and a coolant of the auxiliary line perform the heat transfer with each other in the main heat exchanger.

3. The HVAC system of claim 1, wherein the first valve is a three-way valve, and includes a first port of the battery core side, a second port of a first end side of the branch line, and a third port of a first radiator side, the controller is configured to close the third port of the first valve when the temperature of the battery core is required to be increased, and the controller is configured to close the second port of the first valve when a cooling of the battery core through heat radiation of the first radiator is required.

4. The HVAC system of claim 1, wherein the second valve is a three-way valve, and includes a first port of the electronic component core side, a second port of a first end side of the auxiliary line, and a third port of a second radiator side, and the controller is configured to open all of the ports of the second valve when the temperature of the battery core is required to be increased, and closes the second port of the second valve when the temperature of the battery core is not required to be increased.

5. The HVAC system of claim 1, wherein the battery cooling line includes a first pump, the electronic component cooling line includes a second pump, and the controller is configured to perform a control to drive or stop the first pump or the second pump.

6. The HVAC system of claim 5, wherein the first pump is disposed between an upstream point of the first valve and the second end portion of the branch line on the battery cooling line.

7. The HVAC system of claim 5, wherein the second pump is disposed between an upstream point of the second valve and the second end portion of the auxiliary line on the electronic component cooling line.

8. The HVAC system of claim 1, wherein the battery cooling line includes an auxiliary heat exchanger provided thereon, and the auxiliary heat exchanger is disposed between a downstream point of the battery core and an upstream point of the first valve.

9. The HVAC system of claim 8, wherein the battery cooling line is configured to perform the heat transfer with a refrigerant line for an indoor HVAC through the auxiliary heat exchanger, and the first coolant performing the heat transfer with the refrigerant line at a time of cooling of the battery core cools the battery core.

10. The HVAC system of claim 8, wherein the refrigerant line includes a third valve that supplies or blocks a refrigerant so that the heat transfer between the refrigerant of the refrigerant line and the first coolant of the battery cooling line is performed in the auxiliary heat exchanger.

11. The HVAC system of claim 9, wherein in a case of a cooling mode, the controller is configured to connect the battery cooling line and the branch line with each other by controlling the first valve, and is configured to perform a control so that the first coolant cooled by performing the heat transfer with a refrigerant of the refrigerant line through the auxiliary heat exchanger cools the battery core.

12. The HVAC system of claim 9, wherein in a case of a battery temperature increasing mode, the controller is configured to perform a control so that the second coolant cooling the electronic component cooling line and the first coolant perform the heat transfer in the main heat exchanger to increase the temperature and then increase the temperature of the battery core, by controlling the first valve to connect the battery cooling line and the branch line with each other and fully opening the second valve to connect the electronic component cooling line and the auxiliary line with each other.

13. The HVAC system of claim 9, wherein in a case of a natural cooling mode, the controller is configured to perform a control to circulate the first coolant in the battery cooling line by controlling the first valve, and is configured to perform a control so that the first coolant cooled through the first radiator cools the battery core.

14. The HVAC system of claim 1, wherein the branch line includes an electric heater configured for increasing a temperature of the first coolant, and the electric heater is disposed between the first end portion of the branch line and the upstream point of the battery core.

* * * * *